(12) United States Patent
Zhou et al.

(10) Patent No.: US 6,387,161 B1
(45) Date of Patent: May 14, 2002

(54) NITROUS OXIDE PURIFICATION SYSTEM AND PROCESS

(75) Inventors: Derong Zhou, Doylestown, PA (US); John P. Borzio, Robbinsville; Earle Kebbekus, Princeton, both of NJ (US); David Miner, Walnut Creek, CA (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/721,987

(22) Filed: Nov. 27, 2000

Related U.S. Application Data

(62) Division of application No. 09/373,506, filed on Aug. 13, 1999.

(51) Int. Cl.⁷ .......................... B01D 53/04; B01D 53/26
(52) U.S. Cl. .............................. 95/119; 95/123; 95/128; 95/129; 95/139; 96/130; 96/132; 96/144
(58) Field of Search .......................... 95/117–119, 123, 95/128, 129, 132, 139; 96/121, 130, 132, 143, 144; 423/230, 234, 240.5

(56) References Cited

U.S. PATENT DOCUMENTS

| | | | |
|---|---|---|---|
| 2,850,881 A | | 9/1958 | Hampton et al. |
| 3,348,387 A | | 10/1967 | Kuhlmann .................. 62/50.2 |
| 3,689,212 A | * | 9/1972 | Petit et al. ................ 95/128 X |
| 3,853,516 A | * | 12/1974 | Lyshkow .................. 96/132 X |
| 3,926,590 A | * | 12/1975 | Aibe et al. ..................... 95/129 |
| 4,032,337 A | | 6/1977 | Boyer ........................ 62/47.1 |
| 4,507,271 A | * | 3/1985 | Van Deyck et al. ...... 95/129 X |
| 4,640,323 A | | 2/1987 | Norcia et al |
| 4,663,052 A | * | 5/1987 | Sherman et al. .......... 95/117 X |
| 4,855,276 A | * | 8/1989 | Osborne et al. .......... 95/128 X |
| 4,881,375 A | | 11/1989 | Mattiola et al. |
| 5,006,138 A | | 4/1991 | Hewitt ........................ 62/636 |

(List continued on next page.)

FOREIGN PATENT DOCUMENTS

| | | |
|---|---|---|
| EP | 0 636 576 A1 | 2/1995 |
| EP | 0 638 345 A2 | 2/1995 |
| EP | 076691 A1 | 4/1997 |
| EP | 0949448 A1 | 10/1999 |
| EP | 0 949 470 A2 | 10/1999 |

OTHER PUBLICATIONS

Search Report issued Jul. 31, 2001 in Australian Application No. 200004105–3.

European Search Report in Application No. 00401840.0, dated Jan. 11, 2001.

*Primary Examiner*—Robert H. Spitzer
(74) *Attorney, Agent, or Firm*—Linda K. Russell

(57) ABSTRACT

Provided are a system and method for nitrous oxide purification, wherein the nitrous oxide product for use in semiconductor manufacturing. The system and process involve a first sub-system having a purification tank for holding a liquefied nitrous oxide, therein; a vaporizer in communication with the purification tank to receive, vaporize and convey a nitrous oxide vapor back to the purification tank; a distillation column disposed on a distal end of the purification tank to receive a nitrous oxide vapor; a condenser disposed on the distillation column, wherein light impurities are removed and wherein a nitrous oxide devoid of light impurities is conveyed and converted into vapor in the vaporizer. A second sub-system having a first dry bed vessel is disposed downstream of the vaporizer to receive the vapor and reacting the acid gas therein; a second dry bed vessel downstream of the first dry bed vessel for removing water and ammonia in the vapor. A third sub-system having a product tank wherein the purified nitrous oxide vapor is recondensed; a transferring manifold including a liquid pump, liquid filter and a bypass for distributing the purified nitrous oxide to holding vessels.

18 Claims, 1 Drawing Sheet

U.S. PATENT DOCUMENTS

| | | | |
|---|---|---|---|
| 5,030,610 A | * | 7/1991 | Sakata et al. ............. 95/132 X |
| 5,110,569 A | * | 5/1992 | Jain ......................... 95/123 X |
| 5,141,724 A | * | 8/1992 | Audeh et al. ............. 95/117 X |
| 5,248,488 A | * | 9/1993 | Yan .......................... 95/117 X |
| 5,417,950 A | * | 5/1995 | Sheu et al. ............... 95/129 X |
| 5,500,096 A | | 3/1996 | Yuan ............................ 203/3 |
| 5,656,064 A | * | 8/1997 | Golden et al. ........... 95/139 X |
| 5,701,763 A | | 12/1997 | Howard et al. ............... 62/644 |
| 5,779,767 A | | 7/1998 | Golden et al. |
| 5,922,105 A | * | 7/1999 | Fujii et al. ................ 95/129 X |
| 6,048,509 A | * | 4/2000 | Kawai et al. ............. 95/117 X |
| 6,106,593 A | * | 8/2000 | Golden et al. ........... 95/129 X |
| 6,168,769 B1 | * | 1/2001 | Zisman et al. ........... 95/139 X |

* cited by examiner

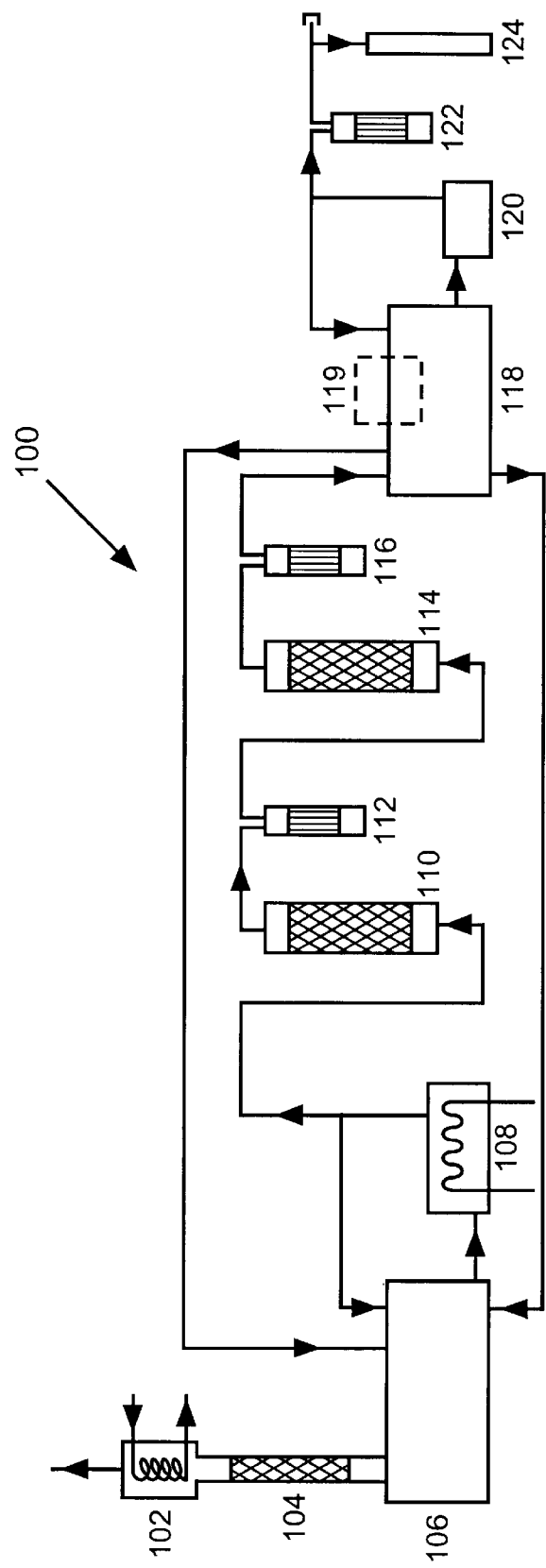

NITROUS OXIDE PURIFICATION SYSTEM AND PROCESS

This application is a divisional, of application Ser. No. 09/373,506, filed Aug. 13, 1999.

BACKGROUND OF THE INVENTION

1. Field of the Invention

The present invention relates to a novel system for the purification of nitrous oxide. The present invention also relates to a method of producing nitrous oxide of ultra-high purity.

2. Description of the Related Art

In the semiconductor manufacturing industry, nitrous oxide ($N_2O$) is employed as a chemical vapor deposition (CVD) process gas for depositing films such as silicon oxide and silicon oxynitride. The use of a highly pure material is important to prevent contamination of the wafers and other deleterious effect on the processes being run ultimately resulting in degraded yield of the final product.

It is particularly important that the nitrous oxide be of ultra high purity, on the order of 99.999% or greater purity. Such a purity will ensure uniform film growth during deposition.

A conventional nitrous oxide purification system and process is described in European Patent Document No. 0 636 576 A1. This document discloses compressing a nitrous oxide feed gas that contains nitrogen, oxygen and water in a compressor. A portion of nitrous oxide, free of water, is conveyed to a heat exchanger where it is condensed to a liquid. The liquid gas is directed to the top of a rectification column for further condensation and returned to the bottom of the rectification column. A second mixed gas-liquid nitrous oxide portion is directed from the heat exchanger to the bottom of the rectifying column as a heating source to vaporize the liquid. The same nitrous oxide is then directed out of the bottom of the column and introduced to the middle of the column. The final product is taken from the bottom of the column having the requisite purity.

One of the disadvantages associated with such a system is that it is far too complex, as it includes three heat exchangers and two rectification sections. In addition, the compressor employed is potentially a secondary source of contamination due to the lubricating oils needed to operate it.

A further disadvantage associated with the system described above and other related art systems is that they are not capable of removing carbon dioxide impurity. Carbon dioxide is known to those skilled in the purification art to be one the most difficult impurities to remove from nitrous oxide. Additionally, although useful in removing nitrogen, oxygen and water impurities, the systems of the related art are not capable of removing other impurities such as carbon monoxide, ammonia, methane and hydrogen. These impurities are hereinafter referred to as light impurities.

To meet the requirements of the semiconductor manufacturing industry and to overcome the disadvantages of the related art, it is an object of this invention to provide a novel system and method for purifying nitrous oxide gas. The invention allows for the removal of impurities and particulates, such that an ultra pure nitrous oxide product having a purity of 99.9998% or higher can be delivered to a point of use.

A further advantage associated with the novel system is that the total cost of purification can be significantly reduced by eliminating complicated secondary operations needed to eliminate carbon dioxide and light impurities other than nitrogen, oxygen and water. In addition, cost and time associated with employment of a distillation column having a number of rectification sections and heat exchangers is eliminated.

It is a further object of the invention to provide a cryogenic distillation design system that reduces the impurities trapped.

It is yet another object of the invention to obtain total reflux in the distillation system due to the design of the condenser and distillation column.

It is a further object of the invention to provide a batch process for the removal of light impurities from nitrous oxide.

It is another object of the invention to provide a continuous process for the removal of acid gases from nitrous oxide.

It is a further object of the invention to minimize the amount of nitrous oxide lost during the process.

It is another object of the invention to provide a purification system wherein the components can be easily accessed to be repaired or replaced in A quick and facile manner.

It is a further object of the invention to provide a system of delivery for ultra pure nitrous oxide.

Other objects and aspects of the present invention will become apparent to one of ordinary skill in the art on a review of the specification, drawing and claims appended thereto.

SUMMARY OF THE INVENTION

In accordance with the present invention, innovative methods and systems for purification of nitrous oxide is provided. The invention finds particular applicability in the semiconductor manufacturing industry, wherein ultra pure chemical gases generated are introduced directly into one or more semiconductor processing tools.

According to a first aspect of the invention a method for removal of light impurities from a nitrous oxide, for a semiconductor production application is provided. The method includes the steps of:

(a) providing a liquefied nitrous oxide in a purification tank;

(b) routing the liquefied nitrous oxide gas from the bottom of the purification tank to a vaporizer, wherein the liquefied nitrous oxide is vaporized to form nitrous oxide vapor;

(c) communicating the nitrous oxide vapor to a a first end of the purification tank and;

(d) conveying the nitrous oxide vapor from the first end and allowing it through the entire vapor space to a second end of the purification tank into a distillation column and a condenser, wherein the light impurities are removed.

In accordance with a further aspect of the invention, a method for nitrous oxide purification, wherein the nitrous oxide product is employed for semiconductor manufacturing. The process includes the steps of:

(a) converting a liquefied nitrous oxide devoid of light impurities to a gas by passing the liquefied nitrous oxide through a vaporizer;

(b) routing the nitrous oxide gas to a first dry bed vessel, wherein an acid gas is absorbed; and (c) conveying the nitrous oxide gas from the first dry bed vessel to a second dry bed vessel, wherein water and ammonia are removed.

In accordance with a further aspect of the invention a method for delivery of a purified nitrous oxide gas in a liquefied state is provided. The method includes:

conveying a purified nitrous oxide from a product tank to at least one holding vessel via a manifold system.

In accordance with yet another aspect of the invention a system for removing light impurities from a nitrous oxide gas is provided. The system includes: (a) a purification tank for holding a liquefied nitrous oxide, having a first end a second end; (b) a vaporizer in communication with the first end of the purification tank to receive the liquid, vaporize and convey a nitrous oxide vapor back to the first end of the purification tank; (c) a distillation column disposed on the second end of the purification tank to receive the nitrous oxide vapor; and (d) a condenser disposed on the distillation column, wherein light impurities are removed out of the vent on top of the column.

In accordance with another aspect of the invention a system for nitrous oxide purification is provided. The system includes: (a) a vaporizer for receiving and converting a liquefied nitrous oxide devoid of light impurities to a vapor; (b) a first dry bed vessel disposed downstream of the vaporizer to receive the nitrous oxide vapor and absorbing an acid gas therein; and (c) a second dry bed vessel downstream of the first dry bed vessel for removing water and ammonia therein.

In accordance with yet another aspect of the invention a system for delivery of a purified nitrous oxide gas. The system includes a product tank for holding the purified nitrous oxide gas and a manifold for distributing the purified nitrous oxide to at least one holding vessel.

Thus, in accordance with the inventive system light impurities are removed within a first sub-system where the process is carried out in a batch type manner. The acid gases and moisture are removed within a second sub-system in a continuous manner and the ultra pure nitrous oxide is delivered via a third-system to the point of use.

BRIEF DESCRIPTION OF THE DRAWING

The objects and advantages of the invention will become apparent from the following detailed description of the preferred embodiments thereof in connection with the accompanying drawing, in which:

The figure of the drawing is a schematic diagram of a novel nitrous oxide purification system.

DETAILED DESCRIPTION OF THE PREFERRED EMBODIMENTS OF THE INVENTION

The invention provides an efficient and effective means of purifying a nitrous oxide from light impurities and acid gases. The term acid gases as used herein is defined as carbon dioxide, nitrogen dioxide, hydrogen chloride and other acid gases known to the artisan skilled in the art.

The invention will be described with reference to the figure of drawing, which illustrates a process flow diagram of a system 100 for purification and delivery in accordance with an exemplary embodiment of the invention.

A nitrous oxide feed gas is processed through several different sub-systems. The feed gas is provided in a first sub-system that includes a full reflux distillation station to remove the light impurities in a batch type process. The process is repeated until substantially all light impurities are removed. Thereafter, the nitrous oxide gas "free" of impurities such as oxygen, nitrogen, methane, and hydrogen and in a vapor phase is conveyed downstream to a second sub-system having at least two purification beds. Therein the acid gases and particulate impurities are removed. Subsequently, a product transfilling sub-system delivers a product nitrous oxide gas having a purity of at least 99.99998% or higher to various holding vessels or to a point of use. It will further become apparent to the skilled artisan, that while these sub-systems are operated as part of one system they may also be operated separately and independently from one another.

The first sub-system includes a purification tank 106 supplied with a commercial available grade of nitrous oxide having a purity of 99.0% or lower. Purification tank 106 may be refrigerated by an integral mechanical refrigeration unit to maintain the pressure within the tank in a range of about 250 psig to about 1000 psig (about 17 bar to about 69 bar). The liquefied nitrous oxide is compressed as the purification tank is preferably operated in a range from about 275 psig to about 350 psig (about 19 to about 24 bar), and more preferably from about 275 psig to about 305 psig (about 19 to about 21 bar). To resist low temperatures (e.g., ranging from about −10 to about −25° F. (about −23 to about −32° C.)) employed during the cryogenic distillation stage, the purification tank is preferably constructed from a carbon steel material to withstand temperatures as low as −45° F. (−43° C.).

The crude nitrous oxide is directed from the bottom of purification tank 106 to external vaporizer 108 which in conjunction operates as a reboiler. By adopting this configuration external vaporizer 108 can be designed to accommodate various production capacity requirements and allows for facile maintenance, repair or replacement thereof.

Vaporizer 108 is operated at a temperature range of about 75 to about 150° F. (about 24 to about 48° C.), and preferably between about 85 and about 110° F. (about 29 to about 43° C.) to convert substantially all the liquid gas provided from purification tank 106 to vapor. The resulting nitrous oxide vapor is subsequently returned and introduced at the top of purification tank 106, preferably at the same end where the liquefied nitrous oxide has been drawn from.

On a distal, preferably opposite end of purification tank 106 a cryogenic distillation column 104 is vertically mounted to treat the nitrous oxide vapor. The vapor is hence forced to travel substantially the entire length of tank 106 prior to its introduction to cryogenic distillation column 104. Through this configuration, a "dead corner" which provides a trap for impurities and is found in conventional reboiler design is eliminated. Therefore, in accordance with the invention, substantially the entire vapor phase containing contaminants therein is introduced in the distillation column.

Distillation column 104 is preferably packed with structured packing made of knitted stainless steel mesh to provide an adequate mass transfer area and a low pressure drop, thus ensuring complete equilibrium between the descending liquid and the rising vapor. A condenser 102 is mounted at the top of distillation column 104 without any inner restriction or blockage between distillation column 104 and condenser 102. The condenser receives the vapor arising through the column 104 and condenses (re-liquefies) substantially all the vapor by maintaining the temperature in a range from about −20 to about −40° F. (about −29 to about −40° C.) through the employment of cooling jacket having liquid nitrogen circulated therein. Other suitable cryogenic cooling means that are known in the art are equally applicable in cooling condenser 102 and distillation column 104.

A total reflux is created within distillation column 104 as non-condensible light impurities including nitrogen ($N_2$), oxygen ($O_2$), argon (Ar), methane ($CH_4$), carbon monoxide (CO), nitric oxide (NO), hydrogen ($H_2$) are retained within condenser 102. Those skilled in the art will recognize that contact of countercurrent streams of liquid and vapor result in an improved separation of components known as refluxing. *Hawley's Condensed Chemical Dictionary*, 13$^{th}$ edn. Thus, through refluxing, where the light impurities have a different condensation temperature point than nitrous oxide, rise in the vapor phase and are trapped in condenser 102. The trapped impurities are slowly removed or allowed to "bleed out" at a slow flow rate to cleanse the condenser. Meanwhile, refluxed nitrous oxide is returned to purification tank 106 in a more purified form than the vapor that had entered column 104 with the added benefit of little or no product loss due to the distillation.

This batch process is subsequently repeated within the first sub-system in a continuous manner until the nitrous oxide is substantially free of light impurities. An additional advantage of the above mentioned process is that metal impurities (e.g., aluminum, calcium and sodium, etc.) settle in purification tank 106, and are not further conveyed to the second sub-system.

Upon removing substantially all the light impurities, a stream of liquefied nitrous oxide is directed to external vaporizer 108 and converted to a vapor. A valve (not shown) disposed downstream of vaporizer 108 is opened and the vapor is directed to a second sub-system which is operated continuously.

The vapor is passed through a first dry bed vessel 110 operated at ambient temperatures. The dry-bed is packed with an acid gas adsorbent to remove carbon dioxide ($CO_2$) and other acid impurities such as nitrogen dioxide ($NO_2$). While not limited hereto consumable adsorbent materials that may be employed includes sodium hydroxide, calcium hydroxide and potassium hydroxide. In a preferred embodiment, dry-bed vessel 110 is provided with a material known under the trade designation ASCARITE®, a supported sodium hydroxide material, to reduce the level of impurities to one part per billion (ppb) by volume of contaminants as a result of the gas-solid reaction therein. Upon saturation, the exhausted adsorbent hydroxide material may be easily replaced and the process continued while minimizing down-time.

As the carbon dioxide is removed from the vapor in dry-bed vessel 110, moisture is generated in the stream. The moisture enriched stream is routed downstream to a second dry-bed 114 operated at ambient temperatures, wherein moisture ($H_2O$) and ammonia ($NH_3$) are removed by an activated molecular sieve, e.g., 5A Zeolite. In general molecular sieves effect separation by virtue of certain adsorptive preferences. For example, in order for the pore system of the molecular sieve material to be available to potential adsorbates, such sieve must first be suitably dehydrated at least partly, preferably to a residual water content of less than 1 weight-percent, i.e., by removal of intracrystalline "zeolitic" water or water of hydration according to methods well known in the art. This treatment creates an activated condition for subsequent adsorption. Accordingly, the molecular sieve adsorbent material referred to hereinabove is initially in a suitably activated condition, and can be regenerated by application of an inert gas and heat upon exhaustion.

Conventional filters suitable for retaining and removing particulates in a vapor stream may be disposed downstream of each dry-bed vessel 110 and 114, respectively. In a preferred embodiment, filters 112 and 116 are utilized to further purify the nitrous oxide gas by removing any particles originating from its respective dry-bed and may be entrained in the vapor phase. In a preferred embodiment nitrous oxide gas exiting filter 116 is routed to a product tank 118 wherein the vapor is re-condensed yielding an ultra-pure liquid gas having a 99.99998% purity.

Product tank 118 incorporates a mechanical refrigeration unit, 191 and is similar in design and holding capacity to purification tank 106. Tank 118 may be provided with a refrigeration unit 119 capable of re-condensing all of the nitrous oxide within purification tank 106 at a designated time period. For example, during clean up, repair or replacement of purification tank 106 the gas therein may be transferred to product tank 118, thereby eliminating the need to transfer the gas off-line to a location where it may be contaminated and additional storing space would be required. Naturally, the reverse process wherein the gas is transferred from product tank 118 to purification tank 106 is equally applicable.

Re-condensed ultra-pure nitrous oxide gas in product tank 118 may be further transferred by a transfilling sub-system to at least one holding vessel or a point of use such as a semiconductor manufacturing tool. In a preferred embodiment, two or more holding vessels 124 are connected in parallel and filled individually. The holding vessels employed may be any containers or cylinders suitable for holding nitrous oxide in an ultra-pure form and may be of various sizes. A cryogenic liquid pump 120 disposed downstream of product tank 118 conveys the ultra-pure nitrous oxide gas to a manifold (not shown) which distributes and delivers the product to holding vessels 124. One or more filters 122 may be disposed between the manifold and the holding vessels 124 to ensure that particulate impurities that may arise from pump 120 and other sources on route to holding vessels 124 are removed so as to deliver the liquid gas in an ultra-pure form.

As the filling operation is continuously performed, the weight of holding vessels 124 is monitored by a floor scale or the like until a desired weight is reached. At that point a bypass in the manifold is opened and the product is returned to product tank 118 as holding vessels 124 are replaced.

EXAMPLE

A nitrous oxide purification system as shown in the figure is pre-commission tested and thereafter thoroughly purged. At this point the system is in condition to begin nitrous oxide purification. Crude, nitrous oxide liquid (i.e., commercial grade) is pumped into a purification tank from a delivery tank truck. The purification tank employed has a maximum holding capacity of about 12,000 lb (5,454 kg) with a maximum work pressure of 350 psig (24 bar). A refrigeration system is incorporated with the purification tank where the temperature of the crude nitrous oxide liquid within the tank is maintained at between −20 and −40° F. (−29 to −40° C.).

From one bottom end of the purification tank, the crude liquid is routed to an external electrical vaporizer through a 1 inch (2.54 cm) 316 L stainless steel tube. The vaporization temperature is maintained at between 80 and 100° F. (27 to 37° C.) and the vaporization capacity ranges from 130 to 150 lb/hr on average depending on the vaporizing temperature setup.

The vapor generated by the vaporizer is routed back to the top of the tank at the same end as the one from which the liquid is drawn out. The vapor flows through the entire head space of the tank, and then enters into the distillation column which is mounted at another top end of the tank. The column is a 3 inch (7.62 cm) schedule 40 316L stainless steel pipe having a height of 96 inch (about 244 cm). About 84 inches (213 cm) of the 316L tube is packed with stainless wool to provide adequate contact surface area between vapor and liquid. The vapor rising along the column through the packings, conducts a mass and heat exchange with the liquid refluxed from the condenser.

The condenser is directly mounted at the top of the column without any inner barrier between the column and the condenser. After flowing through the packings, the vapor conveys into the condenser in which liquid nitrogen cooling coils are installed. The temperature of the condenser is cooled down by liquid nitrogen and maintained at between −20 and −35 F (−29 and −37 C). As a result, the vapor is condensed into liquid, then the liquid totally refluxes to the column and returns into the tank. Gas phase impurities such as oxygen, nitrogen and other non-condensable light impurities remain concentrated in the head space of the condenser. The impurities are then continuously discharged out from the condenser at a rate of between 10 and 15 $ft^3$/hr (0.28 and 0.43 $m^3$/hr). In this example, the cooling coils are made of 316L ½ inch (1.27 cm) stainless steel tubes and have about 14 $ft^2$ heat exchanging surface area. The shell of the condenser is made of 316L 14 inch (35.6 cm) schedule 40 stainless steel pipe with a height of 20 inch (50 cm).

Progress of impurities reduction is monitored by a gas chromatography (GC) model VARIAN 3400 capable of detecting to as low as 0.01 part per million by volume (ppmv). The batch distillation operation and impurity removal continues until the final concentrations of impurities meet customers' requirements or specifications. The time needed for each batch distillation completion depends substantially on initial concentration of impurities and vaporization rate setup.

Once all impurities except for carbon dioxide, nitrogen dioxide, ammonia, and moisture are reduced to less than designated specifications, the cryogenic distillation is taken off line from the purification process. In other words, the vapor from the vaporizer is not routed into the purification tank, instead is directed to one dry bed through ½ inch (1.27 cm) 316L stainless steel tube in order to remove carbon dioxide and other acid gas such as nitrogen dioxide.

The dry-bed vessel is made of a 316L stainless steel 6 inch (15.2 cm) schedule 40 pipe with a height of 72 inch (183 cm). In this example, ASCARITE®, a commercial trade name mainly comprising of sodium hydroxide, is packed within the dry-bed vessel where carbon dioxide and other acid gases are reduced by a gas-solid reaction at a room temperature. The ASCARITE® is able to reduce carbon dioxide to less than the level of 0.01 ppm by volume. ASCARITE®, however, is not regenerable and needs to be replaced once the dry bed is saturated.

After completion of acid gases reduction, the vapor from the ASCARITE® bed is routed into a filter where particulates having a size of 0.003 gm or larger entrained within the vapor stream are retained therein. The filter shell is made of 316L stainless steel 6 inch (15.24 cm) pipe schedule 80 having a height of 12 inch (30.5 cm) and the cartridge is made of TEFLON®.

As particulates and acid gases are removed, the vapor flows to a second dry bed wherein a molecular sieve (MS) AW 300 is used to remove moisture and ammonia. The dimensions of the second dry-bed vessel are similar to the first dry-bed vessel and is made of 316L stainless steel 6 inch (15.2 cm) schedule 40 pipe. Again, the vapor may entrap some particulates out from the dry solid bed of MS AW 300, therefore, another filter is employed prior to forwarding the vapor to the product tank. The filter shell is made of 316L stainless steel 6 inch (15.24 cm) pipe schedule 80 with a height of 12 inch (30.5 cm), and the cartridge is made of Teflon.

The purified $N_2O$ vapor exiting the dry solid bed of MS AW 300 is routed into the product tank and then is condensed into a liquid by refrigeration system which is attached with the product tank. The maximum product hold capacity of the tank is 12000 lb (5,454 kg), operating pressure is at most 350 psig (24 bar), and the lowest operating temperature −40 F (−40 C).

The purified liquid $N_2O$ is subsequently pumped from the product tank into various containers such as cylinders, ton units or ISO containers by using a $N_2O$ liquid pump. The $N_2O$ liquid pump is a positive displacement pump designed for 1000 psig discharge pressure and has a capacity of approximately 5 gallons per minute. The liquid pumping process may also generate some particulates by the pump. Therefore, another filter identical to the aforementioned filter utilized to remove the particulates before the final liquid is pumped into containers may be employed between the pump and the holding vessels to remove the particulates generated by the pump.

Thus, in accordance with the inventive system light impurities are removed within a first sub-system where the process is carried out in a batch type manner. The acid gases and moisture are removed within a second sub-system in a continuous manner and the ultra pure nitrous oxide is delivered via a third-system to the point of use.

While the invention has been described in detail with reference to a specific embodiment thereof, it will be apparent to one skilled in the art that various changes and modifications can be made, and equivalents employed without departing from the scope of the claims.

What is claimed is:

1. A method for nitrous oxide purification, wherein a nitrous oxide product is employed for semiconductor manufacturing comprising:

(a) converting a liquefied nitrous oxide devoid of light impurities to a gas by passing said liquefied nitrous oxide through a vaporizer;

(b) routing said nitrous oxide gas to a first dry bed vessel, wherein acid gas are absorbed; and (c) conveying said nitrous oxide gas from said first dry bed vessel to a second dry bed vessel, wherein water and ammonia are removed.

2. The method for nitrous oxide purification according to claim 1 further comprising:

conveying said nitrous oxide gas from said second dry bed vessel to a product tank and recondensing said nitrous oxide gas.

3. The method for nitrous oxide purification according to claim 1, further comprising:

removing particles from said nitrous oxide gas through a particulate filter disposed between said second dry bed vessel and a product tank.

4. The method for nitrous oxide purification according to claim 1, further comprising:

passing said nitrous gas through a filter disposed between the first and second dry bed vessel.

5. The method for nitrous oxide purification according to claim 1, wherein said first dry bed vessel comprises supported sodium hydroxide.

6. The method for nitrous oxide purification according to claim 5, wherein said sodium hydroxide is replaced upon depletion.

7. The method for nitrous oxide purification according to claim 1, wherein said acid gas comprises carbon dioxide and other acid impurities.

8. The method for nitrous oxide purification according to claim 1, wherein said second dry bed vessel contains an activated molecular sieve.

9. The method for nitrous oxide purification according to claim 1, further comprising:

operating said first and second dry bed vessels at ambient temperature.

10. The method for nitrous oxide purification according to claim 1, wherein said second dry bed vessel is regenerated by application of a dry gas purge and heat.

11. The method for nitrous oxide purification according to claim 1, wherein said nitrous oxide conveyed to a product tank is 99.99998% pure.

12. A system for nitrous oxide purification, wherein a nitrous oxide product is employed in semiconductor manufacturing comprising:

(a) a vaporizer for receiving and converting a liquefied nitrous oxide devoid of light impurities to a vapor;

(b) a first dry bed vessel disposed downstream of said vaporizer receiving said nitrous oxide vapor and absorbing an acid gas therein; and (c) a second dry bed vessel downstream of said first dry bed vessel for removing water and ammonia therein.

13. The system for nitrous oxide purification, according to claim 12, further comprising:

a product tank for receiving a purified nitrous oxide gas and recondensing a purified nitrous oxide vapor.

14. The system for nitrous oxide purification, according to claim 13, further comprising:

a refrigeration unit integral with or separate from said product tank in order to recondense said purified nitrous oxide gas.

15. The system for nitrous oxide purification, according to claim 13, further comprising:

a particulate filter disposed between said second dry bed vessel and said product tank to remove particles in said nitrous oxide gas.

16. The system for nitrous oxide purification, according to claim 12, further comprising:

a filter disposed between said first and second dry bed vessels.

17. The system for nitrous oxide purification, according to claim 12, wherein said first dry bed vessel comprises sodium hydroxide.

18. The system for nitrous oxide purification, according to claim 12, wherein said second dry bed vessel contains an activated molecular sieve.

* * * * *